Nov. 24, 1931.     R. E. ADAMS     1,833,878
ROAD GRADING MACHINE
Original Filed June 22, 1926     4 Sheets-Sheet 1
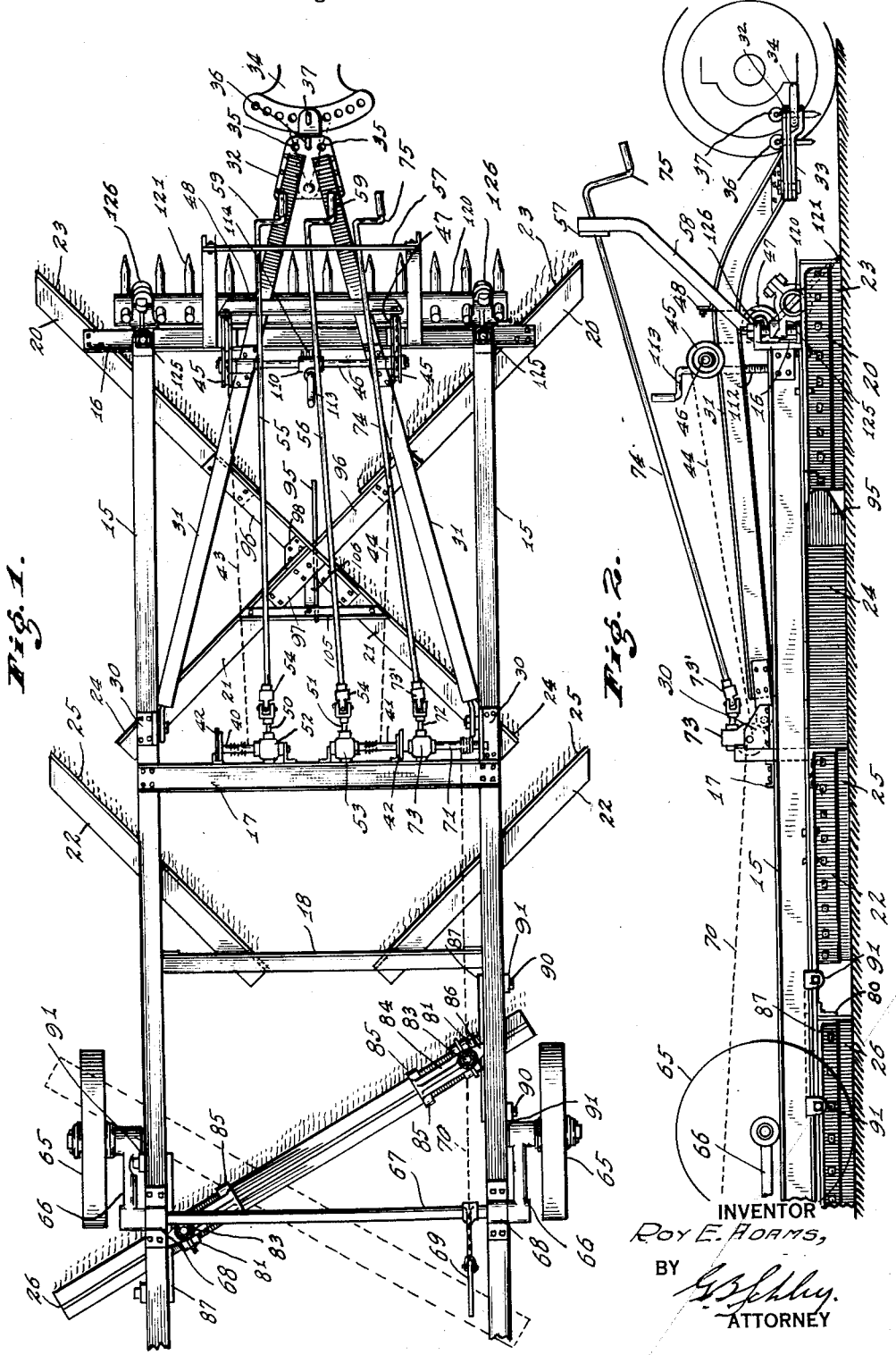
INVENTOR
Roy E. Adams,
BY
ATTORNEY Nov. 24, 1931.    R. E. ADAMS    1,833,878
ROAD GRADING MACHINE
Original Filed June 22, 1926    4 Sheets-Sheet 2
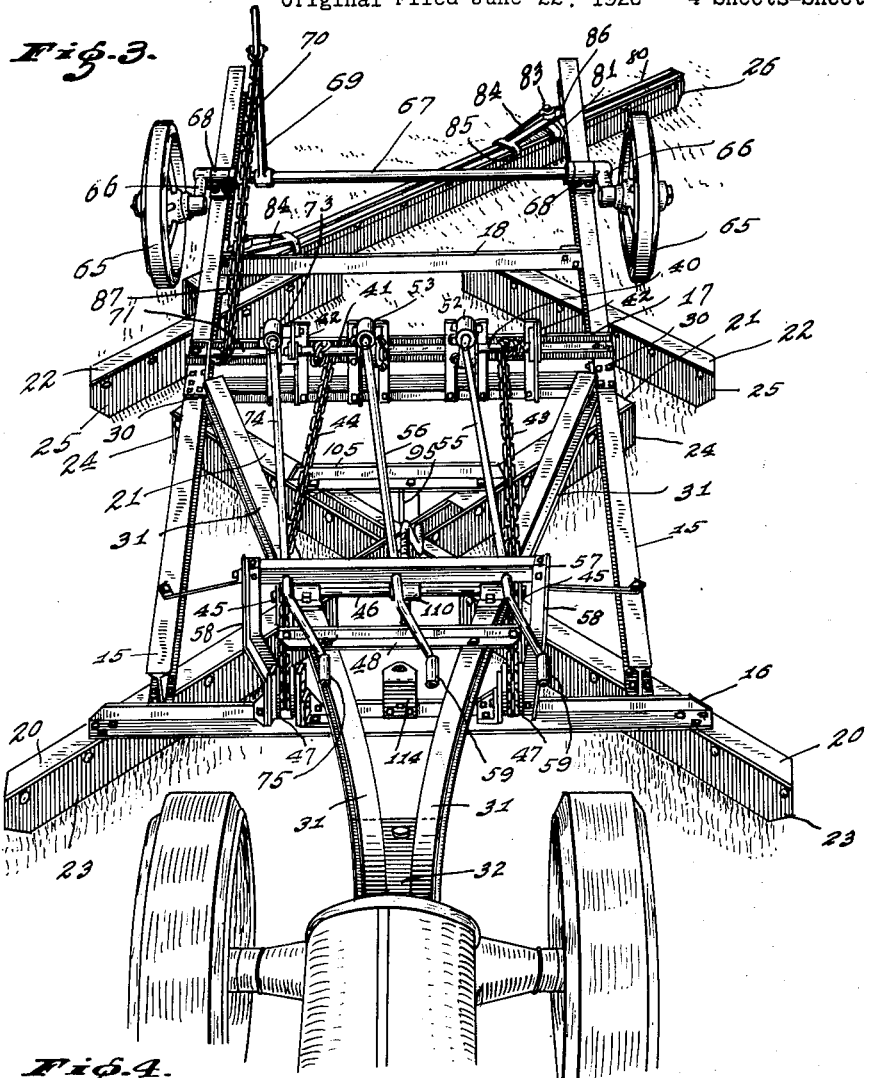
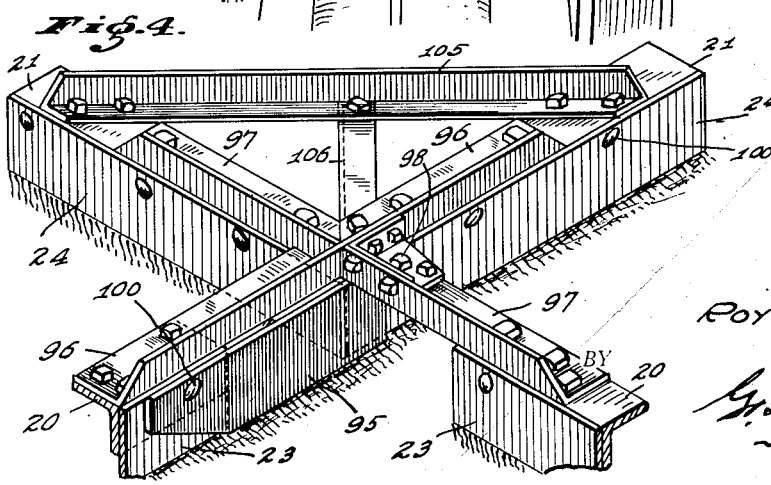
INVENTOR.
Roy E. Adams,
BY
ATTORNEY.

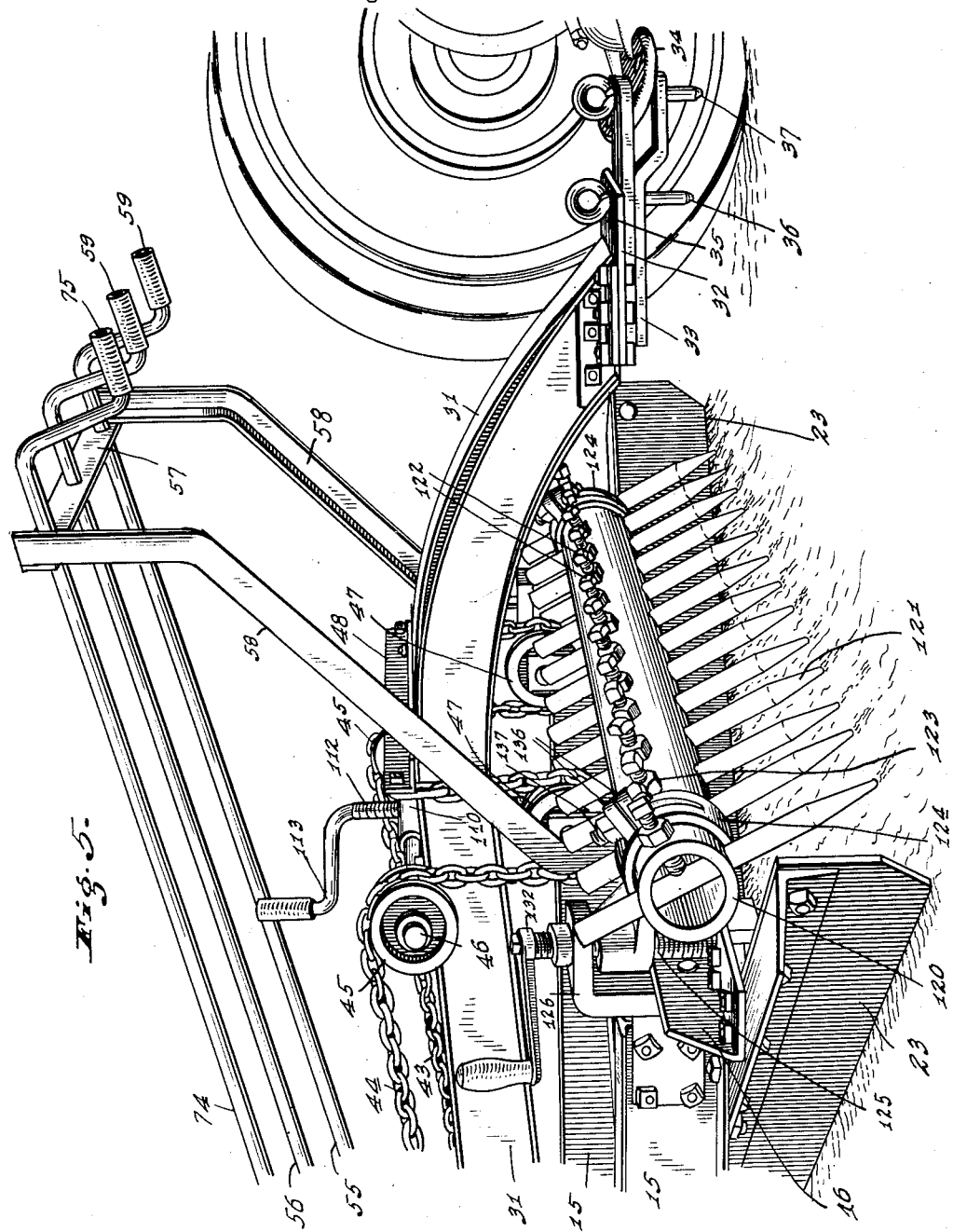

Nov. 24, 1931.   R. E. ADAMS   1,833,878
ROAD GRADING MACHINE
Original Filed June 22, 1926   4 Sheets-Sheet 4
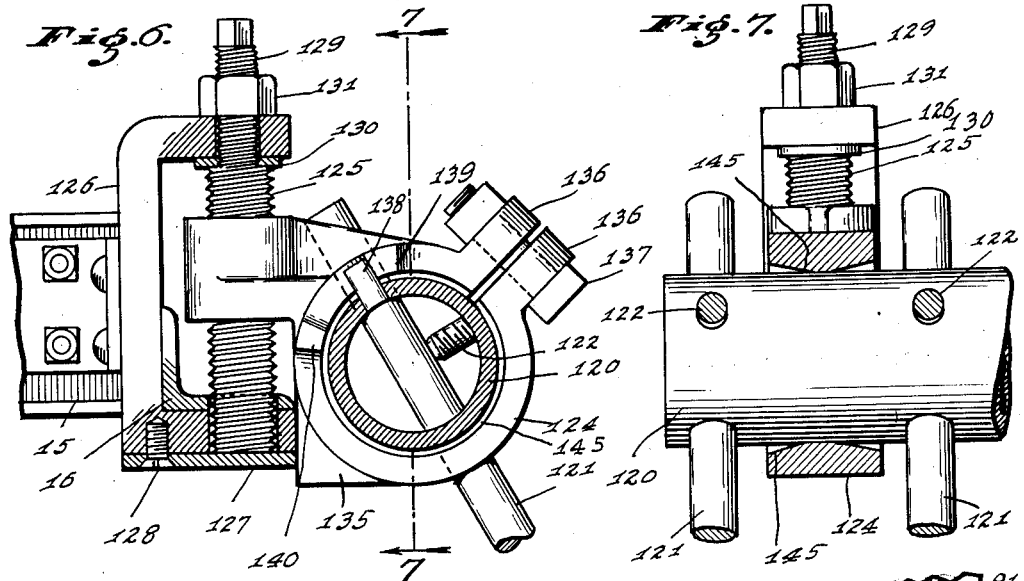
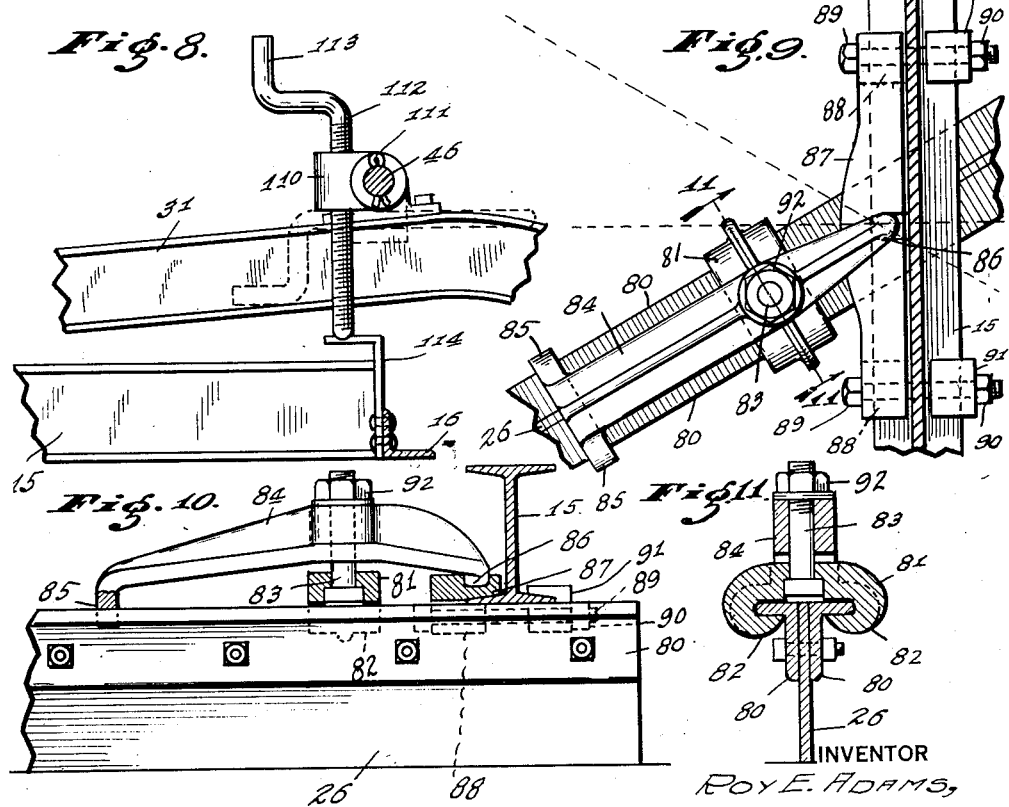

Patented Nov. 24, 1931

1,833,878

UNITED STATES PATENT OFFICE

ROY E. ADAMS, OF INDIANAPOLIS, INDIANA, ASSIGNOR, BY MESNE ASSIGNMENTS, TO J. D. ADAMS MANUFACTURING COMPANY, OF INDIANAPOLIS, INDIANA, A CORPORATION OF INDIANA

ROAD GRADING MACHINE

Application filed June 22, 1926, Serial No. 117,734. Renewed June 13, 1931.

It is the object of my invention to produce a road-grading machine or drag which will comprise a plurality of blades arranged to move loose earth back and forth across the surface of the road as the drag is moved in a forward direction. A further object of my invention is to connect such a drag to a tractor or similar vehicle in such a manner that a portion of the weight of the drag may, when desired, be carried by the tractor, while the remainder of the weight of the drag may be carried on ground-engaging elements such as wheels located at the opposite end of the drag from the tractor. A further object of my invention is to provide such a tractor with a transverse blade which is longer than the distance between such wheels but which may be moved past the wheels for the purpose of adjusting it to various angular positions. A still further object of my invention is to produce a novel scarifier which can be used as an attachment for my drag.

I accomplish the above objects by providing a blade-carrying frame which is supported at one end by adjustably mounted wheels and which has pivotally attached to it a draw-bar adapted to be connected to the tractor, and I provide means for varying the angle between such draw-bar part and the frame of the drag. To obtain the desired adjustment of the long transverse blade, I provide clamps for clamping such blade to the drag frame, and I arrange such clamps so that the blade is slidable in them longitudinally of itself while the clamps and blade are slidable longitudinally of the drag frame.

The accompanying drawings illustrate my invention: Fig. 1 is a plan view of my improved drag showing its method of attachment to a tractor; Fig. 2 is a side elevation of the drag and a portion of the tractor; Fig. 3 is a perspective view of the drag with the scarifier attachment removed; Fig. 4 is a fragmental perspective view illustrating details of construction; Fig. 5 is a fragmental perspective view showing the front end of the drag and the scarifier mounting; Fig. 6 is a fragmental section through the scarifier illustrating details of the scarifier mounting; Fig. 7 is a section on the line 7—7 of Fig. 6; Fig. 8 is a side elevation, in partial section, illustrating a means for elevating the draw-bar; Fig. 9 is a plan showing the clamp by which the long transverse blade is clamped to the drag frame; Fig. 10 is an elevation of the parts illustrated in Fig. 9; and Fig. 11 is a section on the line 11—11 of Fig. 9.

My drag comprises a frame formed of longitudinal side members 15, a front cross member 16, an intermediate cross member 17, and a rear cross member 18. The precise arrangement and number of the longitudinal and cross members shown is not necessary to my invention, as any frame will be adequate which will be rigid enough and which will provide supports for the desired blades.

The number and arrangement and method of mounting of the blades with which my drag is equipped may be anything desired. I have illustrated the drag as provided with a front pair of blade-angles 20, an intermediate pair of blade-angles 21, and a rear pair of blade-angles 22. These blade-angles are conveniently affixed to the under side of the longitudinal and cross members constituting the frame. These blade-angles serve as supports respectively for a front pair of blades 23, an intermediate pair of blades 24, and a rear pair of blades 25 which are bolted to the vertical legs of their respective blade-angles. The lower, or ground-engaging, edges of all the blades are normally co-planar.

Preferably, the front pair of blades 23 converge rearwardly and at their rear ends are spaced apart to provide for the delivery of loose earth to the intermediate blades 24 which meet at their forward ends and diverge rearwardly. The rear pair of blades 25 extend outwardly on each side of the drag beyond the rear ends of the intermediate blades 24 and converge rearwardly, their rear ends being spaced apart to provide for the passage of earth between them.

A distributing blade 26 is mounted on the frame in position to receive the earth discharged from the blades 25. This blade extends completely across the drag frame and is preferably mounted in a manner, hereinafter specifically described, so that it can be arranged to deliver loose earth to either side of the drag.

Mounted at an intermediate point of the drag frame and preferably upon the side members 15 are brackets 30 to which is pivotally attached a draw-bar formed of two arched members 31 which converge forwardly and are connected at their forward ends as by means of a plate 32.

For the purpose of connecting the drag to the tractor or other vehicle used to draw it, there is attached to the plate 32 a link 33, the front end of which may be bifurcated to receive the draw-bar cap 34 of the tractor. Preferably the link 33 is pivotally mounted on the under side of the plate 32 and is provided with a hole adapted to register with any one of an arcuate series of holes 35 in the plate 32. To hold the link 33 in any desired angular position, a pin 36 may be inserted through one of the holes in the plate 32 and the hole in the link 33. The forward end of the link 33 is connected to the draw-bar cap 34 by means of another pin 37. This pivotal mounting of the link 33 is of advantage when the road resistance on one side of the drag is greater than that on the other side. When this condition exists, the tendency of the drag as a whole to assume a position oblique to its line of movement may be counteracted by swinging the link 33 to one side or the other.

In order to provide for carrying part of the weight of the drag on the tractor, I employ means for varying the angle between the draw-bar 31 and the drag frame. Such an adjusting means may conveniently take the form of a pair of transverse, independently rotatable shafts 40 and 41 which are supported from the cross-member 17 in suitable bearings 42. Chains or cables 43 and 44 are connected respectively to the shafts 40 and 41 and extend from such shafts forwardly and upwardly over sheaves 45 which are rotatably mounted on a cross shaft 46 supported from the draw bar members 31. From the sheaves 45, the chains 43 and 44 extend around a second set of sheaves 47 which are rotatably supported from the drag frame. From the sheaves 47, the chains 43 and 44 extend upwardly and are attached to a cross member 48 affixed to the draw-bar members 31.

The transverse shafts 40 and 41 are connected respectively with short longitudinal shafts 50 and 51 by means of gearing located in the housings 52 and 53, such gearing preferably being worm gearing and irreversible. The shafts 50 and 51 are connected respectively by universal joints 54 with operating shafts 55 and 56 which extend forward and upward and are supported by a cross-bar 57 which is attached to the upper ends of supports 58 rigidly affixed to the drag frame. Ahead of the cross-bar 57, the shafts 55 and 56 are bent to form cranks 59 by which they may be operated.

In order that the rear end of the drag may be supported when desired, I provide wheels which are vertically adjustable relatively to the drag frame. One method of mounting such wheels is illustrated in the drawings in which the wheels 65 are rotatably supported from two co-planar arms 66 which are rigidly affixed to opposite ends of a horizontal shaft 67 which extends transversely of the drag frame and is rotatably supported in suitable bearings 68. Rigid with the shaft 67 is an operating arm 69 which when moved forward lowers the wheels 65 and raises the rear end of the drag.

To the lever 69 is attached a chain 70 which extends forwardly and is attached to a transverse shaft 71. The shaft 71 is connected with a short longitudinal shaft 72 by means of gearing located in the gear housing 73, such gearing preferably being of an irreversible type. A universal joint 73' serves to connect the longitudinal shaft 72 with an operating shaft 74 which extends forwardly through the cross-bar 57 and is provided in front of such cross-bar with a crank similar to the cranks 59.

The distributing blade 26, which has been referred to above, is located in rear of the blades 25 in position to deliver to one side of the drag loose earth discharged from the blades 25. Preferably the blade 26 is arranged so that it can be inclined in either direction in order that the loose earth may be delivered to either side of the drag as may be desired. As the rear blade 26 may be longer than the distance between the wheels 65, I prefer to mount the blade 26 so that it can be adjusted without interference from the wheels.

One method of accomplishing this result is illustrated in the drawings. The blade 26 is provided with two blade-angles 80 which are affixed to opposite sides of the blade along the top edge thereof. The clamps which I provide to hold the blade 26 in its adjusted position operate to clamp these blade angles 80 firmly against the lower surface of the frame side members 15. Each clamp consists of a hook 81 which lies above the blade-angles 80 and is provided with opposite inturned fingers 82 adapted to engage the under surface of the horizontal legs of the blade angles. Each hook 81 carries a bolt 83 which extends upward through a clamp-bar 84, one end of which engages the upper surface of the blade-angles 80. Preferably, that end of the clamp-bar 84 which engages the blade-angles is provided with downwardly extending fingers 85 which straddle such blade-angles to prevent displacement of the clamp bar. The other end of the clamp-bar 84 is provided with a downwardly extending boss 86 adapted to be received within a depression in a plate 87 which is clamped to the side member 15 of the drag frame. The plate 87 is adapted to rest on the top of the lower flange of the side member 15 and is provided at its end with fingers 88 which extend beneath such flange. Passing through each of the fingers 88 is a bolt 89 which extends transversely under the side member 15 and at its outer end is provided with a nut 90 which bears against a member 91. The members 91 are notched, as is evident from Fig. 10, to receive the outwardly projecting portion of the lower flange of the I-beam 15.

To hold the blade 26 in fixed position relative to the drag, the bolts 89 are tightened to hold the plates 87 securely in place on the side members 15. Nuts 92 on the bolt 83 are then tightened to clamp the blade-angles 80 against the lower surface of the side members 15.

If it is desired to reverse the blade—for instance, if it is desired to move it from the full-line to the dotted-line positions shown in Fig. 1—the nuts 92 are first loosened and the blade 26 moved longitudinally of itself sufficiently far to the left to permit its right-hand end to clear the right-hand wheel 65. The bolts 89 which hold the right-hand plate 87 in place on its associated side member 15 are then loosened, and this plate 87 is then moved rearwardly past the wheel 65 carrying the right-hand end of the blade 26 with it. The right-hand plate 87 may then be clamped in the desired position on the side member 15 and the blade moved to the right sufficiently far to permit its left hand end to be moved forward past the left-hand wheel 65. The bolts 89 of the left-hand plate 87 are then loosened and such plate is moved forward and clamped to the left-hand side member 15. The blade 26 may then be adjusted longitudinally of itself to the desired position and the nuts 92 tightened to clamp the blade 26 and its associated blade-angles 80 against the under surface of the side members 15.

To prevent the point formed by the forward ends of the intermediate blades 24 from catching on stones or other objects embedded in the road surface or on similar obstructions, I prefer to mount between the blades 24 a vertical plate 95 which extends forward from the point formed by the blades 24 and has its forward lower corner cut off diagonally. This plate 95 will also serve to prevent the accumulation of brush or other similar material on the point formed by the two blades 24.

I prefer to mount the front pair of blades 23 and the rear pair of blades 24 in such position that each front blade will be in substantial alinement with the opposite intermediate blade 24 as is evident from Figs. 1 and 4. The blade angles 20 may then be inter- connected with the blade-angle 21 by means of braces 96 and 97. If desired, the junction of the brace 96 with the braces 97 may be reinforced by means of the reinforcing member 98.

The plate 95 can be removed from the position illustrated in Fig. 2 to that shown in Fig. 4 where it is used to close the gap between one of the front blades 23 and the opposite intermediate blade 24. In this position, the plate 95 may be retained by means of the bolts 100 which serve to hold the blades 23 and 24 to their associated blade-angles.

As a support for the plate 95 when such plate is in a position illustrated in Fig. 2, I attach to the intermediate blade-angles 21 a cross-angle 105 from the middle of which there extends forward a plate-angle 106. The plate 95 may be bolted against the vertical leg of the plate-angle 106 in the same manner as the blades 23 or 24 are bolted to their respective blade-angles.

To aid in attaching my drag to the tractor, I prefer to employ means by which the draw bar 31 may be elevated to the desired height necessary for the engagement of the link 33 with the draw-bar cap 34 of the tractor. To this end I may employ the construction illustrated in Fig. 8 in which the transverse shaft 46, which carries the sheaves 45 above referred to, is provided at an intermediate point with a member 110 which is loosely mounted on the shaft so that it may swing freely. Cotter pins 111 or other means may be provided for preventing displacement of the member 110 along the shaft 46. The member 110 is provided with a screw-threaded hole for the reception of a screw 112 which at its upper end may be bent to form a crank 113. The lower end of the screw 112 is pointed or rounded so that it is adapted to be received within a depression in a bracket 114 conveniently mounted on the front cross member 16 of the drag frame. It will be evident that with the screw 112 in the full-line position illustrated in Fig. 8 such screw may be rotated to lower or raise the front end of the draw bar 31 as may be desired. When the draw bar is attached to the tractor, the point of the screw 112 may be withdrawn from the recess in the bracket 114, and the screw will then assume the dotted line position illustrated in Fig. 8 where it is out of the way and does not interfere with relative movement of the draw bar and drag frame.

If desired, a scarifier attachment such as that illustrated in the drawings may be mounted at the front end of the drag. Such a scarifier comprises a tooth-support 120 conveniently cylindrical and formed of a length of heavy pipe. The tooth support is provided with a series of co-planar diametral holes for the reception of scarifier teeth 121, such teeth being held in place in the tooth-support by set-screws 122 which may be provided with lock-nuts 123.

The tooth support 120 is supported in two split collars 124 which are mounted on opposite sides of the drag frame on vertical adjusting screws 125. The screws 125 are carried in U-shaped brackets 126 which are attached to the front cross-member 16 of the drag frame as is evident from Figs. 5 and 6. A plate 127 may be secured against the under surface of each bracket 126 by screws 128 for the purpose of retaining the screw 125 in place in the bracket. A portion 129 of the screw 125 extends through and above the upper leg of the U-shaped bracket 126 and is reduced in diameter to provide a shoulder on the screw 125, between which shoulder and the upper leg of the bracket 126 a washer 130 may be placed. The upper portion 129 of the screw 125 is screw-threaded for the reception of the lock-nut 131 and at its extreme end is squared for the reception of a wrench or adjusting handle 132. To avoid imposing a heavy stress upon the screw 125 I prefer to provide the collar 124 with a boss 135 having a substantially vertical rear face adapted to bear against the end of the lower leg of the U-shaped bracket 126.

Located on opposite sides of the split in each collar 124 are ears 136 through which extends a bolt 137 which when tightened serves to clamp the collar 124 securely to the tooth support 120. Preferably, the tooth support 120 is provided with a stop pin 138 which is mounted on the tooth support in position to co-operate with two abutments 139 and 140 on the side of one of the collars 124. If desired, both of the collars 124 may be provided with the abutments 139, 140, and a pin 128 be mounted in the tooth support in position to co-operate with each pair of such abutments. The abutment 139 is so located that the teeth 121 will be held at the proper angle for scarifying when the abutment 139 is engaged by the pin 138. When it is desired to operate the drag without using the scarifier, the bolts 137 may be loosened and the teeth 121 and tooth support 120 rotated within the collars 124 until the pins 128 engage the abutments 140, and the bolts 137 then tightened.

As the blades and the scarifier teeth wear, the screws 125 may be operated to raise and lower the scarifier to maintain the ends of the scarifier teeth and the blades at the proper relative height. To prevent binding of the collars 124 on the screws 125 when such screws are not operated simultaneously and at the same speed, the holes in the collars 124 are preferably beveled as indicated at 145 to effect a universal mounting of the scarifier in each collar.

In operation the drag is connected to the tractor in the manner above described, and the tractor is driven over the road drawing the drag behind it. The operation of the drag is controlled by the two cranks 59 and the rear-wheel-adjusting crank 75, these cranks being in such position that they may readily be reached and operated by the driver of the tractor. If the drag has a tendency to cut too deeply into the road surface, a portion of its weight can be shifted to the tractor or to the rear wheels or to both by suitable operation of the cranks 75 and 59. If one side of the drag has a tendency to cut more deeply than the other, this tendency can be counteracted by operation of one of the cranks 59. For instance, if the right-hand blade 23 is cutting too deeply into the road surface, the right-hand crank 59 may be rotated to wrap the chain 44 about the shaft 41. This places the chain 44 under tension and warps the drag frame slightly by tending to raise the right front corner of the frame. This warping of the frame, though slight, is sufficient to counteract the tendency of the blades on one side to cut more deeply than do the blades on the other side. If it is desired to lift the drag completely from the road, the cranks 59 are both operated to wrap the chains 43 and 44 around their respective shafts 40 and 41. The resultant shortening of the effective lengths of the chains brings the draw-bar 31 and the drag frame closer together; and as the front end of the draw-bar 31 is supported on the tractor, the front end of the drag is raised from the surface of the road. To elevate the rear end of the drag, the shaft 75 is operated to wrap the chain 70 about its shaft 71. This action rotates the shaft 67 and lowers the wheel 65 into contact with the surface. Further rotation of the crank 75 results in raising the rear end of the drag.

I claim as my invention:

1. In combination, a tractor, a road grading machine in rear thereof, said road grading machine being provided with a plurality of ground-engaging blades, and means for supporting part of the weight of said road grading machine from said tractor, said supporting means being adjustable to vary the proportion of the weight of the road grading machine which is supported from said tractor, said supporting means including one or more control members located near the front of the road grading machine in position to be operated by the operator of the tractor.

2. In combination, a tractor, a road grading machine in rear thereof, said road grading machine being provided with a plurality of ground-engaging blades, means for supporting part of the weight of said road grading machine from said tractor, said supporting means being adjustable to vary the proportion of the weight of the road grading machine which is supported from said tractor, one or more members adjustably mounted on said road-grading machine, and means for lowering said members relatively to said road grading machine whereby said members may engage the ground and support part of the weight of said machine, said last-named means and said adjustable supporting means including one or more control members located near the front of said road grading machine in position to be operated by the tractor operator.

3. A road-grading machine adapted to be moved over a road in association with a vehicle, said machine comprising a frame, ground-engaging blades mounted on said frame, a draw-bar pivotally mounted at transversely spaced points on said frame on a horizontal transverse axis, the free end of said draw-bar being adapted to be connected to and supported by the vehicle, and a plurality of independently adjustable means for varying the vertical angle between said draw-bar and said frame, said means being connected to said frame at transversely spaced points.

4. A road-grading machine adapted to be moved over a road in association with a vehicle, said machine comprising a frame, ground-engaging blades mounted on said frame, a draw-bar pivotally mounted at transversely spaced points on said frame on a horizontal transverse axis between the ends of said frame, the free end of said draw-bar being adapted to be connected to and supported by the vehicle, two flexible elements interconnecting said draw-bar and said frame, said flexible elements being connected to said frame and said draw bar at transversely spaced points, and means for applying tension to each of said flexible elements.

5. In a road-grading machine, a pair of rearwardly converging blades the rear ends of which are spaced apart to permit the passage of earth between them, a pair of forwardly converging blades located in rear of said rearwardly converging blades and in position to receive loose earth discharged from them, and a removable plate for closing the gap between one of said rearwardly converging blades and the opposite one of said forwardly converging blades while leaving the gap between the other two blades open to permit the passage of earth.

6. In a road-grading machine, a pair of rearwardly converging blades the rear ends of which are spaced apart to permit the passage of earth between them, a pair of forwardly converging blades located in rear of said rearwardly converging blades and in position to receive loose earth discharged from them, and means for closing the gap between one of said rearwardly converging blades and the opposite one of said forwardly converging blades while leaving the gap between the other two blades open to permit the passage of earth.

7. A road-grading machine, comprising a frame, a plurality of obliquely arranged blades mounted on said frame and adapted to move loose earth back and forth over the road as the road-grading machine is moved, and a distributing blade mounted on said frame in rear of said other blades, said distributing blade being angularly adjustable in a horizontal plane so that it can be arranged to discharge loose earth to either side of the road-grading machine.

8. A road-grading machine as set forth in claim 7, with the addition that said distributing blade is adjustable on said frame longitudinally of itself.

9. In combination, a vehicle, a road grading machine connected to said vehicle in rear thereof, and means for supporting part of the weight of said road grading machine from the vehicle, said means including a coupling member connectible to said vehicle, said coupling member being adjustable to different positions laterally of said machine, and means for holding said member in any of its positions of adjustment.

10. In combination, a vehicle, a road grading machine connected to said vehicle in rear thereof, and means for supporting part of the weight of said road grading machine from the vehicle, said means including a link pivotally supported from said road grading machine on a vertical axis and connectible to said vehicle, and means for holding said link in various positions of adjustment about its pivotal axis.

11. In a road grading machine, a pair of forwardly converging blades spaced apart at their front ends to provide a gap, a vertical plate extending longitudinally through such gap, supporting means for removably supporting said plate in such position, the lower surface of said plate ahead of the front ends of said blades sloping downwardly and rearwardly, and means for mounting said plate in position to extend obliquely forward from one of said blades to form an extension therefor.

12. A road grading machine as set forth in claim 7 with the addition that the lower edge of said distributing blade is disposed below the bottom surface of the frame.

13. In a road grading machine having longitudinal side members, a transverse blade, and a clamp for clamping said blade to each of said side members, each of said clamps including a part reacting on said blade, and clamping means acting through said part to draw said blade upwardly toward the associated side member and to clamp it in place, said blade being longitudinally adjustable in said parts.

14. In a road grading machine having longitudinal side members, a transverse blade, and a clamp for clamping said blade to each of said side members, each of said clamps including a bar acting at one end against the associated side member and at the other end against said blade, and clamping means acting at an intermediate point on said bar and tending to draw it toward said blade whereby said blade will be clamped to said side member.

15. In a road grading machine having longitudinal side members, a transverse blade, means for securing said blade to each of said side members, each of said securing means including a clamp-part and a single clamping means for clamping said side-member, clamp-part, and blade together, said blade being longitudinally adjustable in said clamp-parts when the clamping means is released.

16. A road-grading machine adapted to be moved over a road in association with a vehicle, said machine comprising a frame, ground-engaging blades mounted on said frame, a draw-bar pivotally mounted at transversely spaced points on said frame on a horizontal transverse axis between the ends of said frame, the free end of said draw-bar being adapted to be connected to and supported by the vehicle, two tension elements interconnecting said draw-bar and said frame, said tension elements being connected to said frame and said draw bar at transversely spaced points, and means for applying tension to said tension elements and for independently varying the tension in each.

17. In combination with an automotive vehicle, a road drag having a plurality of ground-engaging blades, a shaft rotatably mounted on said drag, a flexible element, means operatively connecting said flexible element to said vehicle, said flexible element being attached to said shaft and adapted to be wound on said shaft as the shaft rotates to suspend at least part of the weight of the drag from the vehicle, and means for rotating said shaft including an operating member located in position to be controlled by the operator of said vehicle.

18. In combination, a road drag having one or more ground-engaging blades, a wheeled vehicle, one or more flexible tension elements, means for connecting said flexible elements to said vehicle whereby at least part of the weight of said drag may be supported from said vehicle, one or more transverse shafts rotatably mounted on said drag, said flexible elements being secured to said shafts to be wound therearound as the shafts are rotated, and one or more operating shafts extending generally longitudinally of said drag, and gearing respectively interconnecting said transverse and operating shafts.

19. In combination, a road drag having one or more ground-engaging blades, a wheeled vehicle, one or more flexible tension elements, means for connecting said flexible elements to said vehicle whereby at least part of the weight of said drag may be supported from said vehicle, and one or more shafts rotatably mounted on said drag, said flexible elements being secured to said shafts to be wound therearound as the shafts are rotated.

20. The combination set forth in claim 19 with the addition that said wheeled vehicle is an automotive vehicle, and means for rotating said shafts, said means including one or more operating handles disposed in position to be controlled by the operator of said vehicle.

21. In combination, a road drag having one or more ground-engaging blades, a wheeled vehicle, said drag being disposed wholly in rear of said wheeled vehicle, one or more flexible tension elements, means for connecting said flexible elements to said vehicle whereby at least part of the weight of said drag may be supported from said vehicle, and one or more shafts rotatably mounted on said drag, said flexible elements being secured to said shafts to be wound therearound as the shafts are rotated.

22. A device of the character described comprising a main frame carrying a plurality of scraper blades, a wheel-supported crank axle, bearings fixedly secured to said main frame for mounting said crank axle in transverse position on said main frame, an arm attached to said axle, a transverse shaft on said frame, a flexible element interconnecting said arm and shaft, means for winding said flexible element on said shaft for raising the rear portion of the frame, a suitable hitch hinged to the frame, a support for the front end of said hitch, and means to raise and lower said hitch relative to said frame.

23. In combination with an automotive vehicle, a road drag having a plurality of ground-engaging blades, and means for supporting at least part of the weight of the road drag from the vehicle, said means including one or more shafts rotatably supported on said drag, flexible tension elements associated with said shafts and adapted to be respectively wound around them by shaft-rotation, mechanism for rotating each of said shafts, and one or more operating members for operating said mechanism, said operating members being located in position to be controlled by the operator of said vehicle.

In witness whereof, I have hereunto set my hand at Indianapolis, Indiana, this 18th day of June, A. D. one thousand nine hundred and twenty six.

ROY E. ADAMS.